(12) United States Patent
Nozaki

(10) Patent No.: US 7,404,493 B2
(45) Date of Patent: Jul. 29, 2008

(54) FILTER DEVICE INCLUDING PLEATED FILTER INCORPORATED IN A HOUSING

(75) Inventor: Fumio Nozaki, Tokyo (JP)

(73) Assignee: Entegris, Inc., Chaska, MN (US)

( * ) Notice: Subject to any disclaimer, the term of this patent is extended or adjusted under 35 U.S.C. 154(b) by 360 days.

(21) Appl. No.: 11/087,840

(22) Filed: Mar. 23, 2005

(65) Prior Publication Data

US 2006/0213827 A1    Sep. 28, 2006

(51) Int. Cl.
*B01D 27/00* (2006.01)
*B01D 35/00* (2006.01)

(52) U.S. Cl. .................. 210/436; 210/435; 210/437; 210/487; 210/493.1; 210/455; 210/472

(58) Field of Classification Search ......... 210/435–437, 210/487, 493.1, 455, 472
See application file for complete search history.

(56) References Cited

U.S. PATENT DOCUMENTS 5,143,612 A * 9/1992 Hamanaka et al. ....... 210/321.8
5,620,599 A * 4/1997 Hopkins et al. ............. 210/420
5,928,511 A * 7/1999 Messner et al. ............. 210/248
6,110,368 A    8/2000 Hopkins

* cited by examiner

Primary Examiner—Krishnan S. Menon
Assistant Examiner—Benjamin Kurtz
(74) Attorney, Agent, or Firm—John E. Pillion; Timothy J. King

(57) ABSTRACT

The present invention provides a filter that can minimize the amount of residual liquid within the housing or container with a simplified construction. The article includes a cylinder portion having a cylindrical internal space with both ends open, a cylindrically formed pleated filter 5 inserted in the internal space of the cylinder portion 3 in contact with the inner wall of the cylinder portion 3 and having upper and lower edges liquid-tightly sealed. A perforate inner core 7 supports the inner surface of the pleated filter 5, lower and upper end caps 9, 11 are liquid-tightly bonded to the respective ends of the cylinder portion 3. A liquid distribution passage 21 communicates with gaps between the pleats of the pleated filter 5 from the lower portion of the cylinder portion 3. A liquid feed inlet 15 communicates with the liquid distribution passage 21 formed between the periphery of the pleated filter and a tapered inner wall surface 8 of the cylinder portion 3. A filtrate liquid withdrawal passage 25 communicates with an internal passage 23 of the perforate core 7, and a filtrate outlet 27 communicates with the withdrawal passage.

12 Claims, 5 Drawing Sheets

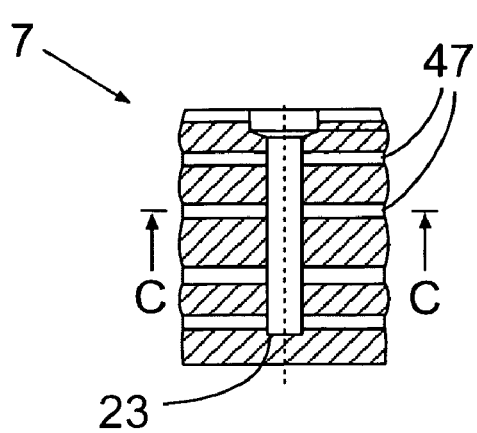
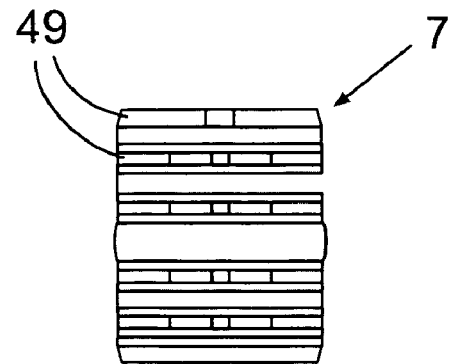
Figure 3aFigure 3b
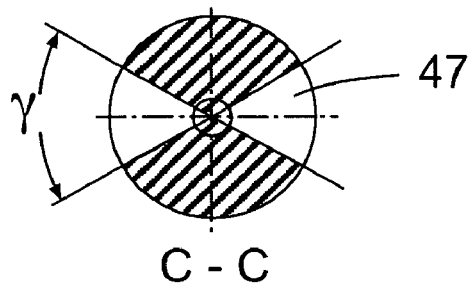
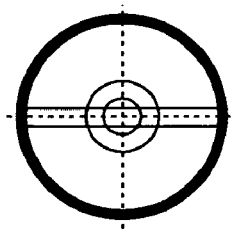
Figure 3cFigure 3d
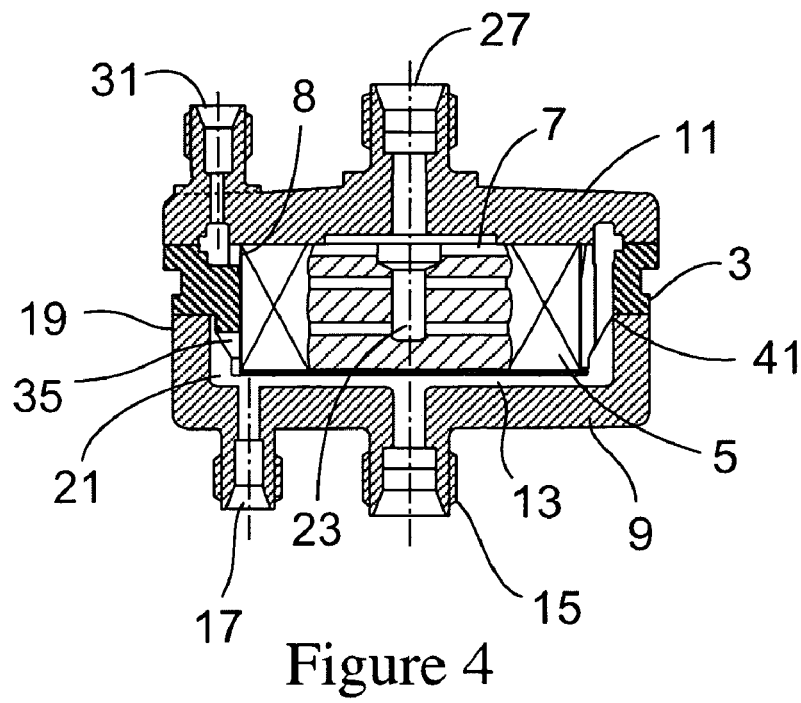
Figure 4

FILTER DEVICE INCLUDING PLEATED FILTER INCORPORATED IN A HOUSING

BACKGROUND

In the filtration, particularly of expensive chemicals in semiconductor industry or the like, it is often necessary to filter a small amount of liquid, for example, about 1 liter and after the completion of filtration it is necessary to recover the residual liquid as much as possible. Particularly, in filtration operations which require a high precision, the size of the particles to be trapped is becoming smaller and smaller and an improved technique for processing a liquid containing such particles is correspondingly demanded. Performance of trapping object particles down to a particle diameter of 0.02 μm is presently required.

In the conventional filtering system which has a principal object of minimizing residual amount of liquid, a filter device including a disc filter (a disc-like filter membrane supported on a perforate support disc) is encased in a housing. However, with such conventional filter device, the filtering surface area of the disc filter is small relative to the size of the housing and according the filtering operation tends to require a long filtering time, because the filtering surface area is restricted to that proportional to square of the outer diameter of the disc filter.

As a measure, a filter device including two or more disc filters stacked on each other (stacked filter) encased in a housing can provide a filtering surface area which is a surface area of a single filter multiplied by the total number of the stacked disc filters, whereby the filtering time is reduced. In this case, however, the volume required for encasing the disc filters becomes larger with the increase of the number of the disc filters because the filter device requires flow passages between the inner surface of the housing for the stacked disc filters and the outer diameter of the stacked disc filters and between the discs, and thus the added volumes of the primary flow passage and the secondary passage become larger per one disc filter with the increase of the number of disc filters. Thus, there is a problem that the residual liquid amount of liquid remaining within these spaces in the housing is large at the time when the filtration of a small quantity of liquid has been terminated.

On the other hand, a filter device composed of a pleated filter, which is formed by pleating a filter membrane, forming it into a cylindrical form and inserting it in a housing, has an advantage that the filtration surface area can be made much larger than the disc filters for the same size of housing, and thus the time period for filtration operation becomes shorter. However, there is a structural disadvantage with respect to the residual quantity of the liquid under treatment.

For example, where a desired amount of liquid is treated within a predetermined period of time, the pleated filter can increase the filtering surface area without significantly increasing the volume of the flow passages and minimize the pressure loss. However, even with this type of structure, a perforate inner cylinder (core) and a perforate outer cylinder (sleeve) having a number of openings are usually required to be installed within a housing for supporting the inner and outer surfaces of the pleated filter and the core has an internal passage, and a space is formed between the sleeve and the cylindrical housing (container) to form a liquid passage for example, Japanese Publication No. 05-111622. These passages are disadvantageous because they form spaces for the stagnant residual liquid unfiltered as well as filtrate at the terminal point of filtration operation.

Especially for filtration of a small amount of liquid, a trial to enhance the filtration precision and to minimize the residual liquid within the filter housing requires a long period of treatment, while a trial to enhance the filtration precision and to minimize the time necessary for the treatment increases the residual liquid within the filter housing.

There is a need to filter small amounts of a liquid to enhance the filtration precision and to minimize the residual liquid within the filter housing. There is a need to filter small amounts of liquid to enhance the filtration precision, minimize the residual liquid within the filter housing, and minimize the filtering time.

SUMMARY

The present invention relates to a filter device which uses a pleated filter membrane incorporated in a housing and is adapted to be used for filtration of a fluid, more particularly a small amount of a fluid to be filtered with a high efficiency. The small hold up volume and large membrane surface area of the device allows particle and or contaminant removal from small volumes of fluid treated by the device with minimal pressure drop. The small fluid hold up volume of the device reduces the loss of expensive reagents or product that have been treated with the device.

The present invention relates to a filter device which uses a pleated filter incorporated in a housing and is adapted to be used for filtration of a liquid, more particularly a small amount of a liquid to be filtered with a high efficiency.

One embodiment of the present invention is a filter device using a pleated filter which is capable of enhancing the filtration precision and reducing the processing time period and yet can minimize the amount of residual liquid or other fluid within the housing or container with a simplified construction.

The present invention overcomes this problem by eliminating the conventional perforate outer sleeve used for supporting the outer periphery of a cylindrically formed pleated membrane filter as well as the space between the filter and the inner wall of a housing or container. The feed liquid is distributed around the pleated filter by way of an annular passage formed at the lower end of the cylinder portion.

More specifically, the problem of the prior art is solved by a filter device that may include a cylinder portion having a cylindrical internal space with both ends open, a cylindrically formed pleated filter inserted in the internal space of the cylinder portion in contact with the inner wall of the cylinder portion and having upper and lower edges liquid-tightly sealed, a perforate inner core supporting the inner surface of the pleated filter, lower and upper end caps liquid-tightly bonded to the respective ends of said cylinder portion, a liquid distribution passage communicating with gaps between the pleats of the pleated filter from the lower portion of the cylinder portion, a liquid feed inlet communicating with the liquid distribution passage, a filtrate liquid withdrawal passage communicating with an internal passage of the perforate core, and a filtrate outlet communicating with the withdrawal passage.

With this construction, there is no perforate outer cylinder (sleeve) such as disclosed in JP-5-111522A nor a passage surrounding the outer cylinder for liquid to be filtered and accordingly the spaces which could otherwise be occupied by the these passages are eliminated, whereby the residual liquid amount within the housing is reduced. According to the present invention, the liquid to be filtered is supplied via supply passage directly to the spaces or gaps between the pleats from outside and according to an experiment it has been determined that the filtering time period required for a given amount of filtrate is not substantially different from the conventional filter device using pleated filter.

According to one mode of the present invention, the feed liquid inlet is provided in the lower end cap and the filtrate outlet is provided in the upper end cap. With this embodiment, the constructions of the cylinder portion and the upper and lower end caps are simplified, the resin injection mold is simplified, and thus the production of the filter device becomes easy and economical.

According to another mode of the present invention, the feed liquid inlet is provided in the cylinder portion and said filtrate outlet is provided in the upper end cap.

According to a further mode of the present invention, the lower portion of the inner peripheral surface of the cylinder portion forms a tapered surface divergent toward the lower open end of the cylinder portion and the distribution passage is defined by the tapered surface and the outer periphery of the cylindrical pleated filter. With this mode, the liquid is easily distributed to the gaps between all of the pleats of the pleated filter whereby the filtration efficiency is enhanced.

According to yet another mode of the present invention, the lower end cap is a cup-shaped member having a annular portion having a larger inner diameter than the inner diameter of the cylinder portion and the cylinder portion has a thin wall at the lower end which is superposed with the annular portion with an interposing gap and liquid guide groove(s) passes through the thin wall. According to this mode, the liquid flows to the gap and then through the liquid guide groove(s) to the all outer surface of the filter so that the liquid is easily distributed to the gap between the pleats. On the other hand, the lower edge of the thin wall may support the lower end of the pleated filter.

According to additional mode of the present invention, the bottom edges of the pleated filter, the bottom surface of the cylinder portion and the bottom surface of the perforate core may be sealed by a disc-shaped plastic film sheet. By so doing, the bottom end of the pleated filter can be easily sealed and a uniform distribution of the liquid is made possible. Similarly, sealing of the upper end of the pleated filter may be affected by using an interposing plastic disc film.

According to a further mode of the present invention, the volume occupied by the perforate passages and the internal passage of the core is set at less than 50% of the total core volume. This further reduces the amount of residual liquid within the filter device. In this case, for a better flow of liquid, the perforate passages preferably have cross sections larger at the upstream side than the downstream side.

Yet further mode of the present invention, the upper portion of the inner peripheral surface of the cylinder portion forms a tapered surface divergent toward the upper open end of the cylinder portion and the gas collecting passage is defined by the tapered surface and the outer periphery of the cylindrical pleated filter. The liquid feed passage may be communicated with a gas vent port by way of a gas vent passage. This mode makes it possible to remove dissolved gases or b bubbles in the liquid to be treated.

These and other feature, aspects, and advantages of the present invention will become better understood with regard to the following description, appended claims, and accompanying drawings.

BRIEF DESCRIPTION OF THE DRAWINGS

FIG. 3 shows a perforate core of the filter device according to the an embodiment, (a) is a cross sectional view, and (b) is a front view, (c) is a c-c cross section of FIG. 3, and (d) is a plan view.

FIG. 4 is a front cross sectional view of a filter device according to the an embodiment of the present invention.

DETAILED DESCRIPTION

Figure 1A:
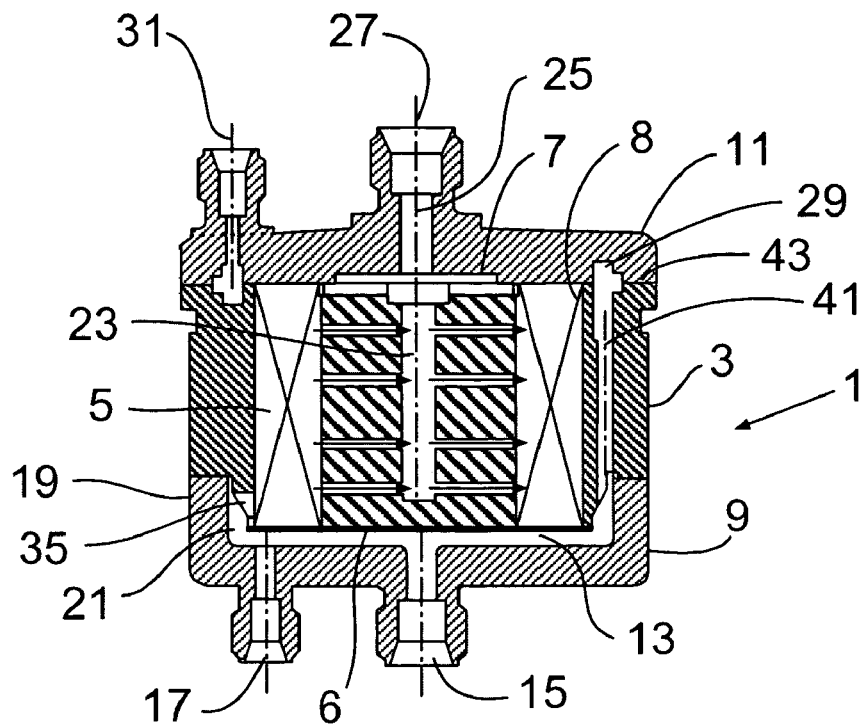
FIG. 1 shows an embodiment of filter device according to the present invention, (a) is a front cross sectional view, (b) is a plan view, and (c) is a bottom view.

Before the present compositions and methods are described, it is to be understood that they are not limited to the particular compositions, methodologies or protocols described, as these may vary. It is also to be understood that the terminology used in the description is for the purpose of describing the particular versions or embodiments only, and is not intended to limit their scope which will be limited only by the appended claims.

It must also be noted that as used herein and in the appended claims, the singular forms "a", "an", and "the" include plural reference unless the context clearly dictates otherwise. Thus, for example, reference to a "pleat" is a reference to one or more pleats and equivalents thereof known to those skilled in the art, and so forth. Unless defined otherwise, all technical and scientific terms used herein have the same meanings as commonly understood by one of ordinary skill in the art. Although any methods and materials similar or equivalent to those described herein can be used in the practice or testing of embodiments disclosed, the preferred methods, devices, and materials are now described. All publications mentioned herein are incorporated by reference. Nothing herein is to be construed as an admission that the present disclosure is not entitled to antedate these references.

"Optional" or "optionally" means that the subsequently described event or circumstance may or may not occur, and that the description includes instances where the event occurs and instances where it does not.

As described, the present invention aims at providing a compact filter device having a small capacity and, for this purpose, the present invention has eliminated the conventional sleeve and narrowed the flow passages and has adopted such a construction that the liquid can evenly distributed to all pleats of the pleated filter.

A first mode of the present invention may include a cylinder (1) portion open at both ends. The cylinder portion has such an inner diameter that the pleated filter is directly held by the cylinder. In order to uniformly feed and distribute the liquid to be filtered, it is preferable that (a) the lower end portion of the cylinder portion is smaller in diameter than the inner peripheral wall surface of the lower end cap, and having a thin wall portion through which large openings (guide grooves) pass, thereby providing an annular flow distribution passage between the inner periphery of the low end cap and through the openings; or (b) the inner surface of the lower end portion of the cylinder portion is formed as a tapered surface divergent toward the lower open end so as to form a feed liquid distribution passage between the outer periphery of the cylindrical pleated filter.

Further, as means for venting gases dissolved in the liquid to be filtered, it is preferable that the inner surface of the upper end portion of the cylinder portion is made a tapered surface divergent toward the upper open end of the cylinder portion, so that a vent passage is formed between the tapered inner surface and the outer periphery of the pleated filter so as to guide gases to the gas vent port.

In the case of (1)(a) above, to provide a feed flow passage around the thin wall portion for smooth feeding and distribution of the liquid to be filtered by way of the through openings formed in the thin wall portion, the lower end cap is formed as a cup-shaped member having an inner diameter larger than the thin film portion and an outer dimension end capable of being welded to the lower edge of the cylinder portion. The upper edge of the cup-shaped member is welded to the lower edge of the cylinder portion. In the case of (1)(b) above, it is sufficient that the distribution passage or channel formed between tapered surface of the cylinder portion and the outer periphery of the pleated filter is communicated with the feed passage for the liquid to be filtered.

A cylindrical structure having as small space volume as possible rather than the conventional simple perforate cylinder may be used for a core. To this end, it is desired that the volume of the internal passage and the perforations occupies less than 50% of the volume of the core.

An auxiliary sheet, for example a disc sheet, may be used for welding. In order to reduce the number of parts, it is desired to weld the upper and lower ends of the core as well as the upper and the lower ends of the pleated filter simultaneously. For this purpose, a disc-shaped plastic film sheet is preferably placed at least against the lower end face of the core (and an annular plastic film sheet if used for sealing the upper surface) and the lower end face of the pleated filter (preferably, the upper end face, too) and then sealed by welding.

Another mode of the present invention may include a cylinder portion. As in the first mode, the cylinder portion is open at both ends. The cylinder portion has such an inner diameter that the pleated filter is directly held by the cylinder portion. The upper and lower ends of the cylinder portion are welded to upper and lower end caps. In order to easily supply liquid to be filtered from the lower end of the pleated filter to the spaces or gaps between the pleats of the filter, the inner surface of the lower portion of the cylinder portion is tapered divergently toward the lower open end, so that a distribution channel or passage is formed between the tapered surface and the outer periphery of the pleated filter for the liquid to be treated. This distribution passage is communicated to a feed passage and then to a feed inlet for the liquid to be treated. The feed passage may be provided tangentially on the outer surface of the pleated filter so that the liquid is introduced tangentially to the outer periphery of the pleat filter from the feed passage and is uniformly distributed to the spaces or gaps between the pleats of the pleated filter.

A lower end cap is provided. The lower end cap may be a simple plate of such a diameter as it is possible to be welded to the bottom end of the cylinder portion. A core may be constructed as in the mode 1 although other constructions may be possible. An auxiliary sheet, for example a disc sheet, is provided for welding. During assembly the upper and lower ends of the core as well as the upper and the lower ends of the pleated filter may be welded simultaneously. For this purpose, a disc-shaped or other suitably shaped plastic film sheet may be placed against the lower end faces of the core and an annular plastic film sheet is preferably placed against the upper surface, and the lower end face of the pleated filter and the upper end face are then sealed by welding. The films may extend in between the cylinder portion and the end caps.

It should be noted that materials used for the cylinder portion, upper and lower end caps of lids and perforate core which are structural members, and material for pleated filter which is functional member, may be prepared from various synthetic plastic materials, taking into consideration their corrosion resistance, chemical resistance, heat resistance and the like and are well known in the art for example from Japanese Publication No. 05-111622 and the construction and manufacturing method of the pleated filter are also well known by Japanese Publication No. 05-111622 and accordingly reference should be made to that document. Also, common reference symbols are used for similar parts for all embodiments and different parts will be explained separately.

Preferred embodiments of the present invention will now be explained in the following by making reference to the accompanying drawings.

Figures 1B, 1C:
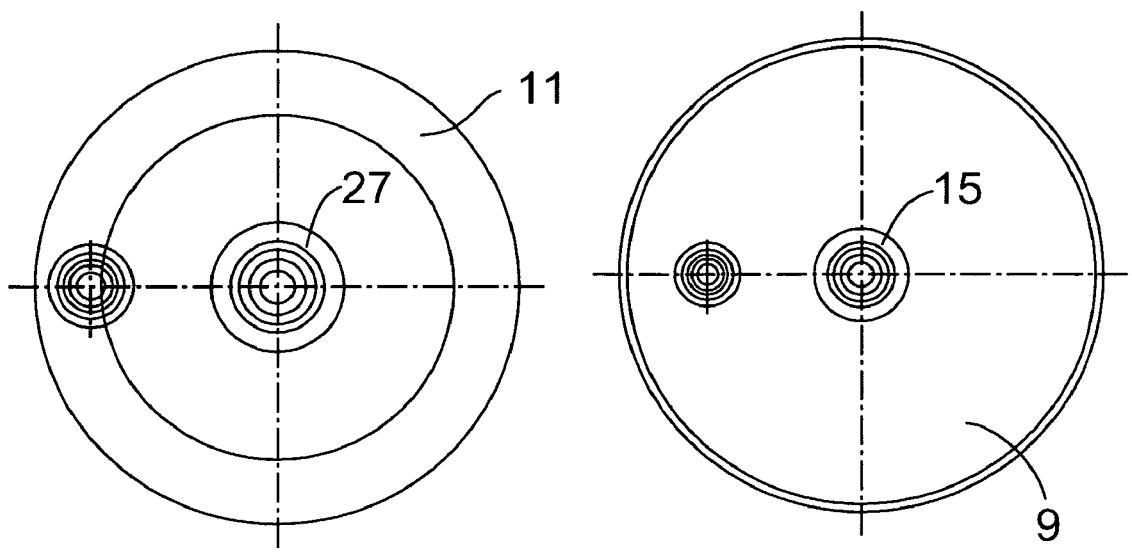

FIG. 1 illustrates a filter device according to the an embodiment of this invention, in which (a) is a front cross sectional view, and (b) is a plan view.

Figure 2A:
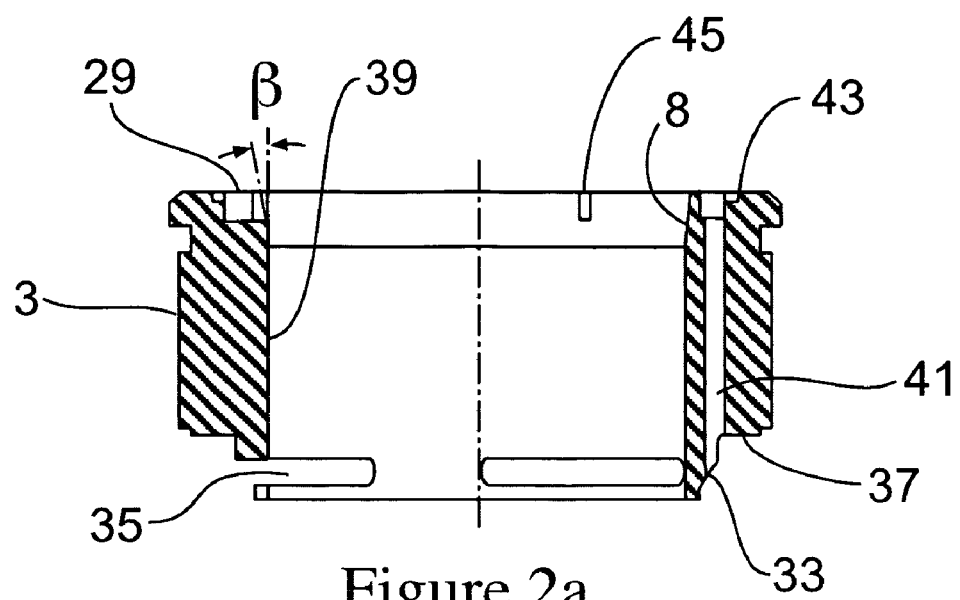
FIG. 2 shows a cylinder portion constituting a part of the housing of the filter device according to an embodiment of the present invention, (a) is a front cross sectional view, and (b) is a bottom view.
Figure 2B:
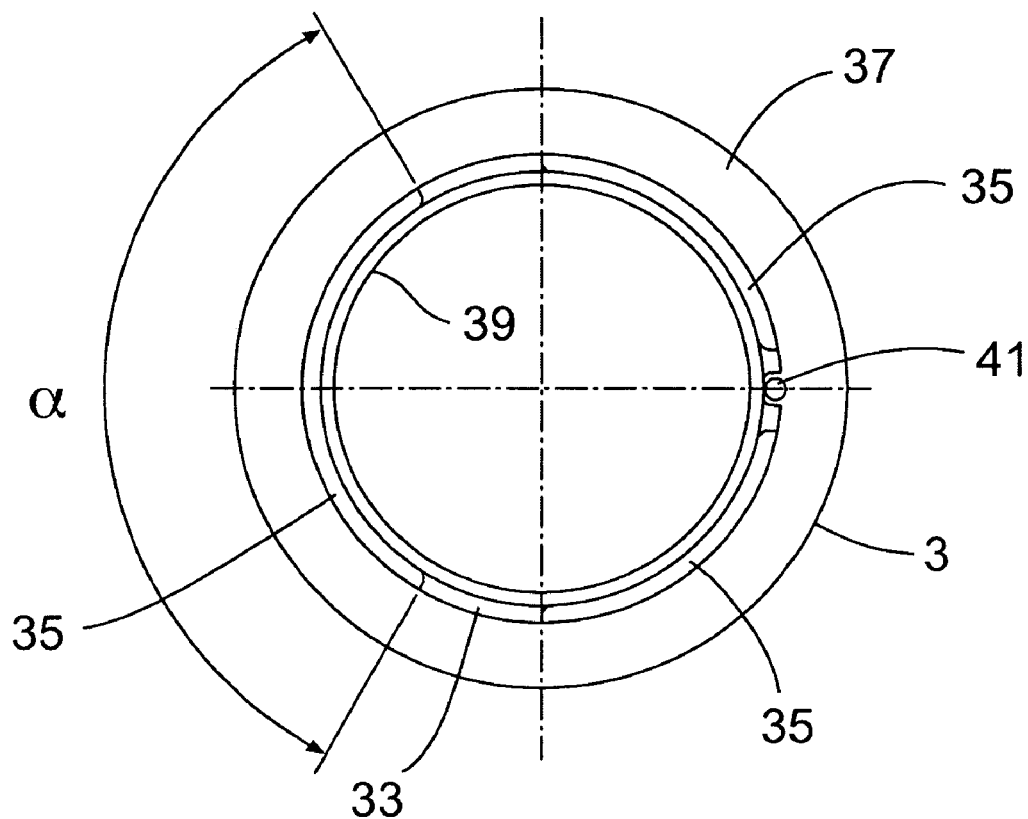

The filter device illustrated in FIG. 1 and FIG. 2 may include a cylinder portion 3 having a cylindrical internal space with both ends open, a cylindrically formed pleated filter 5 inserted in the internal space of the cylinder portion 3 in contact with the inner wall 39 of the cylinder portion 3 and having upper and lower edges liquid-tightly sealed, a perforate inner core 7 supporting the inner surface of the pleated filter 5, and lower and upper end caps or lids 9 and 11 liquid-tightly bonded to the respective upper and lower ends of said cylinder portion 3. The cylinder portion 3, lower and the upper end caps 9, 11 form together a liquid-tight housing.

The lower end cap 9 is provided with a liquid feed inlet 15 for liquid to be treated and the feed inlet 15 is communicated via a liquid feed passage 13 with an annular liquid distribution passage or channel 21 formed between the outer surface of a thin wall portion 33 provided at the lower end of the cylinder portion 3 and the inner peripheral surface of a ring portion 19 of the lower end cap 9. This distribution passage 21 is, in turn, communicated with gaps between the pleats of the pleated filter 5 from the lower part of the cylinder portion 3 by way of a plurality of openings 35 provided in the thin wall portion 33. The feed passage 13 is formed by spacing the lower ends of the perforate core 7 and the pleated filter 5 from the inner bottom surface of the lower end cap 9. Accordingly, liquid to be treated can be uniformly distributed around the periphery of the pleated filter 5. According to this embodiment, the lower end faces of the perforate core 7 and the pleated filter 5 are tightly sealed using a non-porous disc-shaped plastic film sheet 6, which is prepared from a material capable of being weld-bonded to these members. Further, to reduce the volumes of the feed passage 13 of the lower end cap 9, the inner bottom surface of the lower end 9 may be air-tightly welded to the lower ends of the perforate core 7 and the pleated filter 5 with the non-porous disc plastic sheet 6 interposed between them. In this case, the inner bottom of the lower end cap 9 must have a plurality of radial grooves communicated with the feed inlet 13. In some case, the lower end cap 9 may be provided with an outlet 17 for withdrawing residual liquid.

The lower end cap 9 is formed into a cup shape, and the annular portion 19 is made thinner than the cylinder portion 3, whereby the annular distribution passage 21 surrounds the thin wall portion 33 near the lower end of the pleated filter 5. The thin wall portion 33 may simply have a uniform thickness but preferably be tapered as shown in the drawings so that a smoother feed liquid distribution can be performed. The inner periphery of this thin wall portion 33 forms an extension of the inner surface of the cylinder portion 3 to support the outer periphery of the pleated filter 5. Further, the lower edge of the thin wall portion 33 is bonded to the disc-shaped plastic film sheet 6 as described, so as to permit uniform distribution of the liquid to be treated or filtered through openings 35.

The upper end cap 11 is provided with a filtrate withdrawal passage 25 communicated with an internal passage 23 of the perforate core 7 and an outlet 27 for withdrawing the filtrate.

Preferably, an annular vent passage 29 is formed at the bonded interface between the upper end cap 11 and the cylinder portion 3 and the vent passage 29 is communicated with feed passage 13 for the liquid to be filtered as well as with the periphery of the pleated filter 5 so as to discharge gases dissolved in or present as bubbles in the feed liquid.

FIG. 2 shows a cylinder portion forming a part of the housing according to the first embodiment, in which (a) is a front view and (b) shows a bottom view.

As shown in FIGS. 1 and 2, the inner surface 39 of the cylinder portion 3 constitutes a surface for directly supporting the pleated filter 5. Also, the cylinder portion 3 is provided at its lower end with the thin wall portion 33 through which three (generally plural) peripherally-extending elongated openings 35 are formed. The opening angle α of the openings 35 should be as large as possible (100 degrees for example) to reduce the flow resistance to the liquid. Furthers as already described, the thin wall portion 33 defines the annular distribution passage 21.

The cylinder portion 3 has a vent passage 41 passing vertically through the wall of the cylinder portion. The vent passage 41 is connected with the annular distribution passage 21 at the lower end and with the annular gas vent passage 29. Further, to vent the gases efficiently, the inner surface of the cylinder portion 5 has a tapered surface 8 diverging toward the top end at an angle β so as to form a gas collection passage between the outer periphery of the pleated filter 5 and the tapered surface 8. A part of the gas vent passage 29 is communicated via a horizontal passage 45 with this gas collection passage, thereby to withdraw gases accumulated in the upper outer portion of the pleated filter 5.

As shown in FIG. 1, the upper end 43 of the cylinder 3 is welded to the periphery of the upper end cap 11 and the lower end 37 is welded to the upper edge of the annular portion 19 of the lower end cap 9. Here, a ring-shaped plastic disc sheet may be used to facilitate the welding and sealing.

FIG. 3 shows the perforate core according to the first embodiment, in which (a) is a front cross sectional view, (b) is a front view, (c) is a cross sectional view taken along the line C-C of FIGS. 3(a) and (d) is a plan view.

Referring to FIG. 1(a) and FIG. 3, the outer peripheral surface of the perforate core 7 supports the inner periphery of the pleated filter 5 and has a plurality of radial passages 47 communicating with the internal passage 23 for withdrawing filtrate permeated through the filter 5. The passages 47 are in the form of outwardly divergent sectors as shown in FIG. 3(c) for efficient withdrawal of the filtrate. The angle γ should be as large as possible so long as the inner peripheral surface of the filter 5 is appropriately supported. For the same purpose, the outer surface of the perforate core 7 has a number of shallow peripheral grooves 49 connected with the passages 47.

It will be understood that the internal passage 23 and the flow passages 47 are smaller than the internal passages used in the conventional filter device using pleated filter. The total volume of the internal passage 23 and the flow passages 47 is less than about 50%, preferably less than about 30% of the total volume of the perforate core 7. The embodiment shown in FIG. 3 has a volume of about 10% which has been found sufficient to attain a useful flow rate. The volume of the internal passages 23 and flow rate attained by the device may be varied in accordance with an application's flow rate and pressure drop.

The construction of pleats in a porous membrane may be produced for example according to the methods disclosed in Japanese Publication No. 05-111622 incorporated herein by reference in its entirety and may include stacking a pair of non-woven fabrics or net-like sheets on both surfaces of a porous filtration membrane, pleating the laminate into a cylindrical form, and sealing superposed lateral edges together. The pleats can be in a corrugated shape or spirally positioned and can have a loop cross-section or a folded cross-section such as an M-shaped cross-section. The pleated structure provides increased surface area as compared to a flat or curved non-pleated sheet construction.

Porous membrane filters are distinguished from other non-membrane filters by the fact that membranes have a narrower pore size distribution, can be made with very small pores, and their structure is monolithic, i.e. the solid structure is permanently bonded forming a continuous solid phase. In contrast, non-membrane filters are formed by fibers held in place by mechanical entanglement or other surface forces. Depending on the pore size range, membranes that may be used in embodiments of the present invention may include: microporous or MF membranes, with pores approximately in the range of about 0.02 to about 10 microns; ultrafiltration or UF membranes with pores small enough to retain macromolecules (molecular weight of about 1,000 to about 10,000,000 daltons); nanofiltration (NF) or reverse osmosis (RO) membranes with pores capable of retaining small molecules and even ions (molecular weight of about 10 to about 1,000 daltons).

Membranes in embodiments of the present invention may be used as support structures for adsorptive resins as disclosed by Yen et al. in U.S. Pat. No. 5,531,899. whose disclosure is hereby incorporated by reference in its entirety. These type of membranes find application in adsorptive purification processes or as a combined filter and purifier. Additionally, membranes may include those made with surfaces that have been chemically modified by the attachment of chemical moieties to act as adsorptive media. An example is disclosed by Steuck et al. in U.S. Pat. No. 4,618,533 whose disclosure is hereby incorporated by reference in its entirety. Both of these types of membranes can also be used with the present invention. Additional membranes contemplated to be used in the present invention include those disclosed by Moya in U.S. Pat. Nos. 6,354,443, 6,179,132, 5,976,380, 5,928,792 and the like.

Membranes may be made from various materials, including polymers, metals, ceramics, glass and carbon. These types of membrane materials may be used with the present invention. Membranes may be made of any number of polymers, such as polyethylene, ultra-high-molecular-weight polyethylene (as defined by U.S. Pat. Nos. 4,828,772 and 4,778,601), polytetrafluoroethylene, polycarbonate, polypropylene, polyethersulfone and polyvinyidene fluoride. The membranes may have active adsorbents trapped within the structure of the membrane or attached to the membrane surfaces (e.g. ion exchange resins, activated carbon, ligands for specific solutes). In one embodiment of the low hold up volume filter, an ultra-high-molecular-weight polyethylene membrane with a retention rating of from about 0.02 to about 0.05 microns may be used. In another embodiment, an ultra-high-molecular-weight polyethylene membrane with a retention rating of about 0.02 micron may be used. In another embodiment of the low hold up volume filter, a membrane with a retention rating of about 0.05 micron may be used. These types of membranes and their retention characteristics are similar to those found in Microgard™ filters sold by Mykrolis Corporation of Billerica, Mass.

Although reference has been made to the use of various embodiments of the low hold up volume filter for removing particles, gels, ions or other contaminants from fluids used in semiconductor processing the present invention is not limited to treating fluids used in semiconductor processing. For example, chemically and physically compatible low hold up volume filters may be used to remove contaminants and particles from a wide variety of fluids such as but not limited to radioactive materials, biological and medical fluids, specialty chemicals, pharmaceuticals, and other fluids in which a low hold-up volume for the treated fluid can be advantageous.

Assemblage of the filter device having the above-mentioned construction will be explained in reference to FIG. 1(a). The cylindrically formed pleated filter 5 is fit over the periphery of the perforate core 7, and then the cylinder portion 3 is sleeved over the outer periphery of the pleated filter 5. The upper end of them are heated and bonded to molten lower surface of the upper end cap 11 and ten the melt-bonded assembly is cooled. To assist the melt-bonding, a ring-shaped plastic film sheet may be used. Thus, the upper end of the pleated filter is completely liquid-tightly sealed and united with the other members.

Next, the disc-shaped plastic film sheet 6 is placed on and heat-bonded to the lower end faces of the perforate core 7, the pleated filter 5 and the cylinder portion 3.

Then, to this half-finished assembly, the lower end cap 9 is attached and the lower end of the cylinder portion 3 and the upper end of the cup of the lower end cap 9 are welded together. A ring-shaped plastic film may be used to assist the welding.

FIG. 1 shows a finished filter device according this embodiment. It is assumed that the discharge port 17 has been closed. Liquid to be filtered is introduced from the feed inlet 15, flows through the feed passage 13 radially to the lower outer periphery the pleated filter 5, is then distributed between the pleats of the filter and flows upward. During this upward flow, the liquid permeates through the filter and the filtrate flows through the passages 47, the internal passage 23 and the withdrawal passage 25 of the core 7 and is recovered from the outlet 27, while gels and solids contained in the feed liquid are captured on the outer surface of the filter 5.

On the other hand, the bubbles and gases released from dissolved gases are led from the distribution passage 21 to the vent passage 41 and then to the annular vent passage 29, and are discharged from the vent port 31. Also, the gases going upward from around the pleated filter 5 are led to the horizontal passage 45 to the annular vent passage 29.

The salient feature of the present invention is that the pleated filter 5 is directly contacted with the inner surface of the cylinder portion 3 and that the feed liquid is directly distributed to the spaces or gaps between the pleats of the pleated filter 5 from the lower end of the outer periphery of the filter 5. With this feature, the ratio of the volume occupied by the flow passages per the filter device is reduced to a level much smaller than the conventional device so that residual quantity of liquid within the filter device becomes small. Also, the gas venting is effected smoothly because of the presence of the tapered surface 8 on the inner surface of the cylinder portion.

FIG. 4 shows a modified embodiment of the present invention. This embodiment shows a filter device for treating a smaller amount of liquid to be filtered in which the heights of the perforate core 7, pleated filter 5 and cylinder portion 3 are lower than the corresponding members in the first embodiment. The other constructions and operation are the same as Embodiment 1.

Figure 5A:
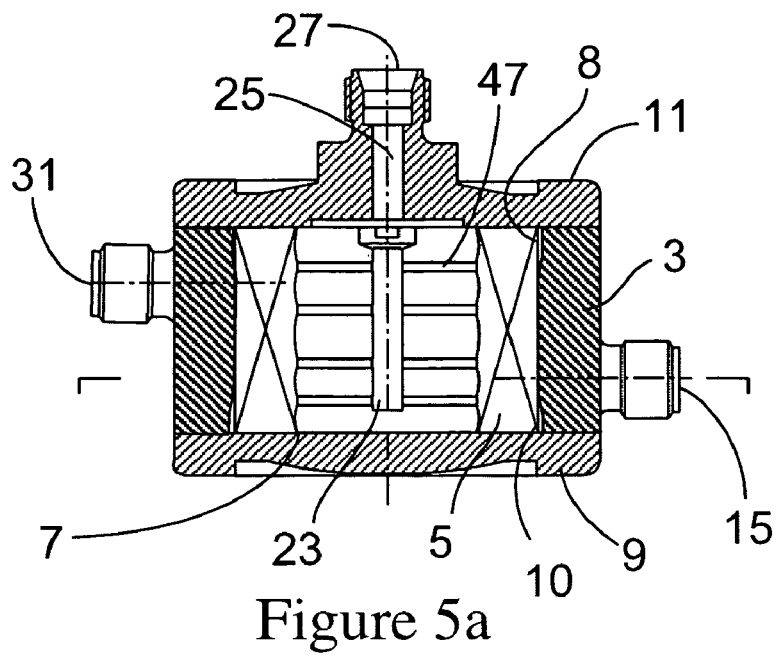
FIG. 5 shows an embodiment of the filter device according to the present invention, (a) is a front cross sectional view, (b) is a plan view and (c) is a front cross sectional view.
Figure 5B:
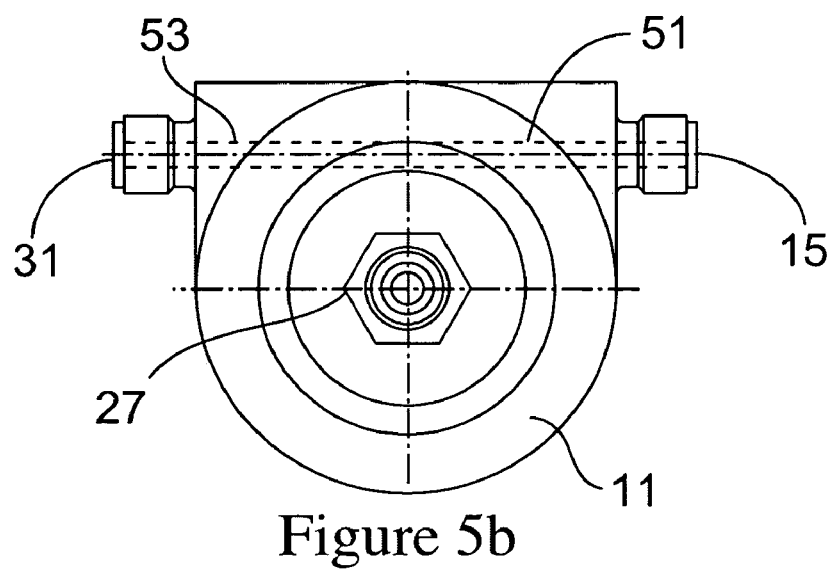
Figure 5C:
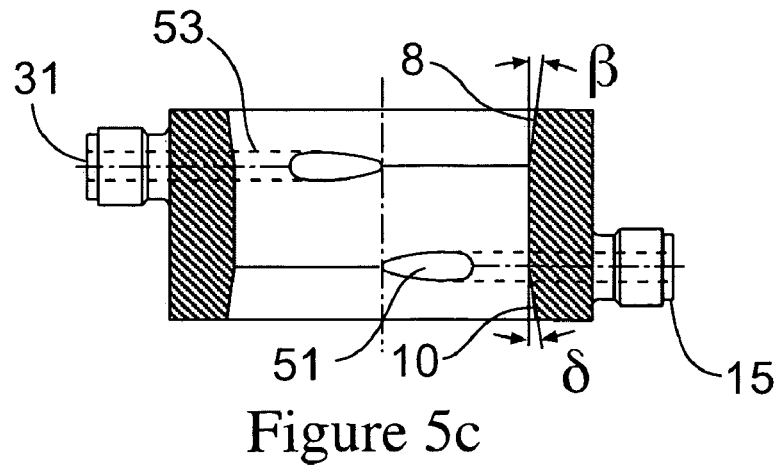

This embodiment is an example in which the feed inlet for a liquid to be filtered and the vent port are mounted on the lateral side of the filter device. In FIG. 5, (a) is a front cross sectional view, (b) is a plan view, and (c) is a front cross sectional view of the cylinder portion. The filter device 1 according to this embodiment includes a cylinder portion 3, a cylindrically formed pleated filter 5 inserted in the internal space of the cylinder portion 3 in contact with the inner wall 39 of the cylinder portion 3, a perforate inner core 7 supporting the inner surface of the pleated filter 5, and lower and upper end caps or lids 9 and 11 liquid-tightly bonded to the respective upper and lower ends of said cylinder portion 3. The cylinder portion 3, lower and the upper end caps 9, 11 form together a liquid-tight housing. The above structure is similar to those described in Embodiments 1 and 2.

However, in this embodiment, the lower end cap 9 does not have any feed inlet for a liquid to be filtered but instead the cylinder portion 3 is provided with a feed inlet 15 on a lower portion of the side wall of the cylinder portion 3. The feed inlet 15 is communicated with a feed passage 51 which opens tangentially to a lower portion of the outer periphery of the pleated filter 5. The inner surface of the cylinder portion 3 is tapered divergently toward its lower open end to form a tapered surface 10 having an angle δ, whereby a liquid distribution passage is formed between the outer peripheral surface of the pleated filter 5 and the tapered surface 10. This angle δ has as small angle as possible in a range that the liquid distribution is not hindered. For example, the δ may range from about 5 degrees to about 20 degrees, or from about 10 to about 12 degrees.

On the other hand, a vent port 31 is provided on an upper portion of the cylinder portion 3 and communicated with a vent passage 53. Similarly, a tapered surface 8 is formed having an angle β to form a gas collection channel between the outer periphery of the pleated filter 5 and the tapered surface 8. The angle β can be in a range such as from about 5 to about 20 degrees, other angles are possible which do not hinder the gas venting. The lower end of the cylinder portion of the cylinder 3 is not provided with distribution passage illustrated in Embodiment 1 but simply is welded to the lower end cap 9. The structure of the perforate core 7 is substantially the same as explained in connection with FIG. 3 and the construction of the pleated filter 5 is too.

Preferably, ring-shaped and disc-shaped plastic film sheets may be inserted between the upper and the lower ends of the perforate core 7 and the pleated filter 5 to assist melt-bonding them.

In operation of this embodiment, the liquid to be filtered is introduced from the feed inlet 15 to the feed passage 51, flows tangentially to the outer periphery of the pleated filter 5, is distributed via the distribution channel between the tapered surface 10 into the spaces or gaps between the pleats of the filter and flows upward. During this upward movement, the liquid permeates through the porous membrane of the pleated filter 5 as a filtrate which then flows through the passage 47, internal passage 23 and the withdrawal passage 25 and is recovered from the outlet 27 as a purified filtrate. Gels and solid particles are captured on the outer surface of the pleated filter. On the other hand, the gases from the dissolved gas and bubbles are collected upward along the space formed between the outer surface of the pleated filter and the tapered surface 8 and are discharged from the bent port 31 by way of the vent passage 53.

In this embodiment, too, since the conventional perforate outer support as well as the passage surrounding the support are dispensed with, the volume of the flow passages are greatly reduced as compared with the conventional filter device which uses a pleated filter and thus the ratio of volume of the residual liquid per filter device used for a small amount filtration is reduced to a much greater extent.

Figure 6:
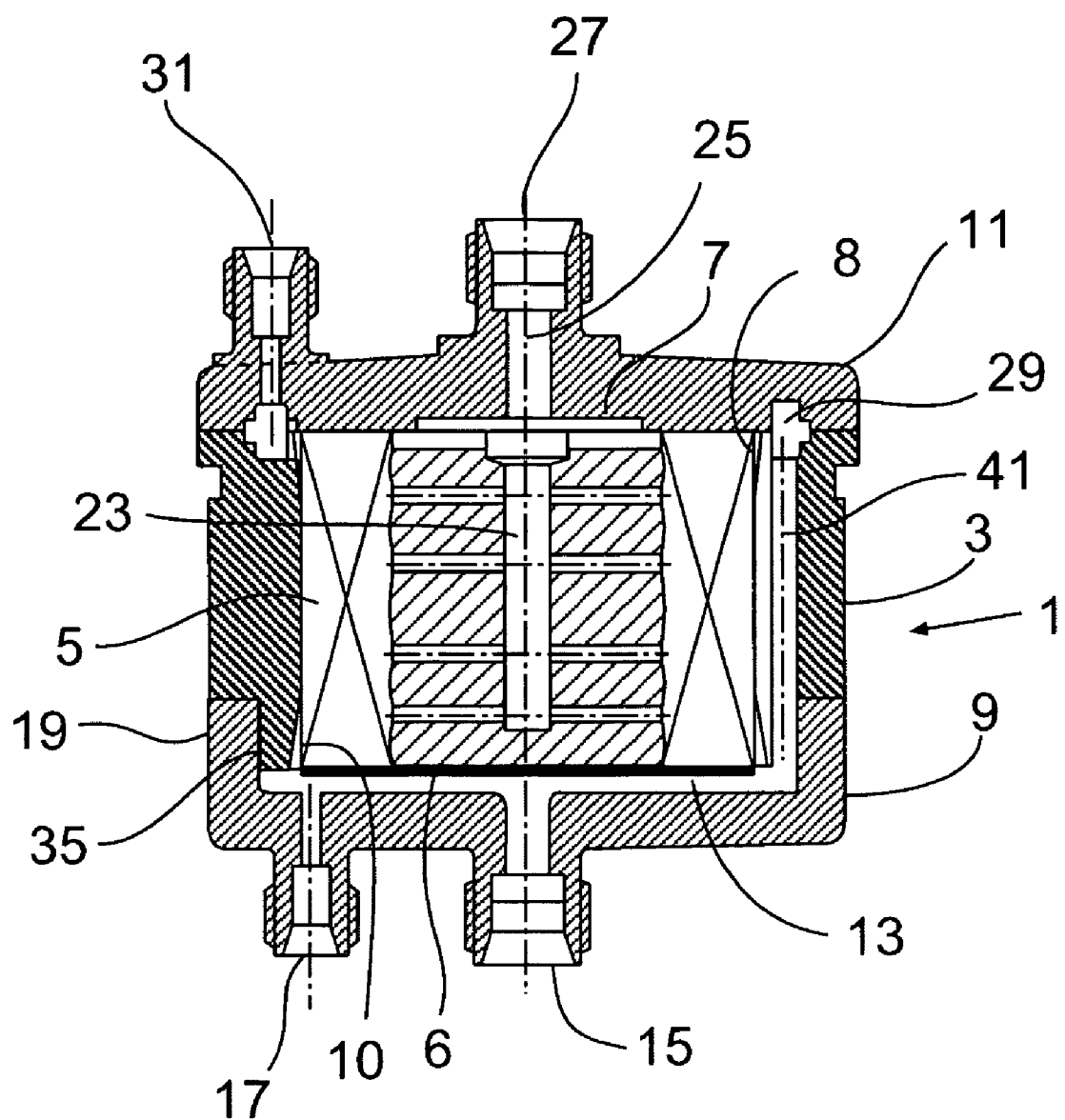
FIG. 6 shows a front cross section of an embodiment of the filter device according to the present invention

Referring to FIG. 6, this embodiment is an example in which the feed liquid distribution passage in FIGS. 1-3 may be replaced with a feed liquid distribution passage similar to Embodiment 2 (FIG. 5). That is, the distribution passage communicated with the feed passage 13 is formed by the divergent tapered surface 10 formed at a lower portion of the inner surface of the cylinder portion 3.

The conventional filter device including a pleated filter encased in a housing has a disadvantage that its larger volume occupied by the flow passage is large and correspondingly the residual liquid volume is large when the filtration is terminated.

Referring to FIG. 1 and FIG. 2, the present invention overcomes this problem by a cylinder portion 3 having a cylindrical internal space with both ends open, a cylindrically formed pleated filter 5 inserted in the internal space of the cylinder portion 3 in contact with the inner wall 39 of the cylinder portion 3 and having upper and lower edges liquid-tightly sealed, a perforate inner core 7 supporting the inner surface of the pleated filter 5, lower and upper end caps 9, 11 liquid-tightly bonded to the respective ends of said cylinder portion 3, a liquid distribution passage 21 communicating with gaps between the pleats of the pleated filter 5 from the lower portion of the cylinder portion 3, a liquid feed inlet 15 communicating with the liquid distribution passage 21 formed between the periphery of the pleated filter and a tapered inner wall surface 8 of the cylinder portion 3, a filtrate liquid withdrawal passage 25 communicating with an internal passage 23 of the perforate core 7, and a filtrate outlet 27 communicating with the withdrawal passage.

Although the present invention has been described in considerable detail with reference to certain preferred embodiments thereof, other versions are possible. Therefore the spirit and scope of the appended claims should not be limited to the description and the preferred versions contain within this specification.

What is claimed is:

1. A filter device without a perforate outer cylinder sleeve that supports the outer periphery of a cylindrically formed pleated filter, said filter device comprising:
    a cylinder portion having a cylindrical internal space with both ends open, said cylinder portion having an upper end, and said cylinder portion having a lower end, said cylinder portion has a tapered inner surface that is divergent toward the upper end of the cylinder portion to form a gas collection passage defined by the tapered inner surface of cylinder portion and an outer periphery of a cylindrically formed pleated filter, said gas collection passage communicated with a vent passage, the lower end portion of the cylinder portion has a thin wall portion through which guide grooves pass;
    said cylindrically formed pleated filter inserted in the cylindrical internal space of the cylinder portion, said cylindrically formed pleated filter in contact with an inner surface of the cylinder portion said cylindrically formed pleated filter having upper and lower edges liquid-tightly sealed;
    a gas vent port that discharges gas collected in said gas collecting passage;
    a perforate inner core supporting an inner surface of the pleated filter, said perforate inner core having an upper end and a lower end, said perforate inner core has a plurality of radial passages of outwardly divergent sections;
    a lower end cap liquid tightly bonded to the lower end of said cylinder portion and an upper end cap liquid-tightly bonded to the upper end of said cylinder portion; the upper end of said cylindrically pleated filter, the upper end of said perforate core, and the upper end of said cylinder portion are bonded to a lower surface of said upper end cap, and wherein said cylinder portion, said lower end cap, and said upper end cap are welded together to form a liquid tight housing;
    an annular liquid distribution passage communicating with gaps between pleats in a lower end of the cylindrically formed pleated filter, said annular liquid distribution passage formed between the lower end of the cylinder portion and lower outer periphery of said cylindrically formed pleated filter;
    a liquid feed passage formed by spacing the lower end of the perforate core from an inner bottom surface of the lower end cap, said liquid feed passage communicates with the feed inlet and the annular liquid distribution passage, wherein said liquid feed passage is communicated with the gas vent port by way of a gas vent passage;
    a liquid feed inlet communicating with the annular liquid distribution passage;
    a filtrate liquid withdrawal passage communicating with an internal passage of the perforate core; and
    a filtrate outlet communicating with the filtrate liquid withdrawal passage.

2. The filter device of claim 1 wherein said feed liquid inlet is provided in the lower end cap and said filtrate outlet is provided in the upper end cap.

3. The filter device of claim 2 wherein the lower end cap is a cup-shaped member with an annular portion having a larger inner diameter than a lower end portion of the cylinder portion, the lower end portion of the cylinder portion is superposed with the annular portion of said cup-shaped member with an interposing gap.

4. The filter device of claim 2 wherein the lower edge of the cylindrically formed pleated filter and the lower end of the perforate core are sealed with a single plastic sheet.

5. The filter device of claim 2 wherein a volume occupied by perforate passages and an internal passage of the perforate inner core is less than 50% of a total perforate inner core volume.

6. The filter device of claim 1 wherein said feed liquid inlet is provided in the cylinder portion and said filtrate outlet is provided in the upper end cap.

7. The filter device of claim 6 wherein the lower end cap is a cup-shaped member with an annular portion having a larger inner diameter than a lower end portion of the cylinder portion, the lower end portion of the cylinder portion is superposed with the annular portion of said cup-shaped member with an interposing gap.

8. The filter device of claim 6 wherein the lower edge of the cylindrically formed pleated filter and the lower end of the perforate core are sealed with a single plastic sheet.

9. The filter device of claim 6 wherein a volume occupied by perforate passages and an internal passage of the perforate inner core is less than 50% of a total perforate inner core volume.

10. The filter device of claim 1 wherein the lower end cap is a cup-shaped member with an annular portion having a larger inner diameter than a lower end portion of the cylinder portion, the lower end portion of the cylinder portion is superposed with the annular portion of said cup-shaped member with an interposing gap.

11. The filter device of claim 1 wherein the lower edge of the cylindrically formed pleated filter and the lower end of the perforate core are sealed with a single plastic sheet.

12. The filter device of claim 1 wherein a volume occupied by perforate passages and an internal passage of the perforate inner core is less than 50% of a total perforate inner core volume.

* * * * *